April 30, 1929.　　　　M. F. CARR　　　　1,711,456
FASTENER STUD
Filed Feb. 18, 1928
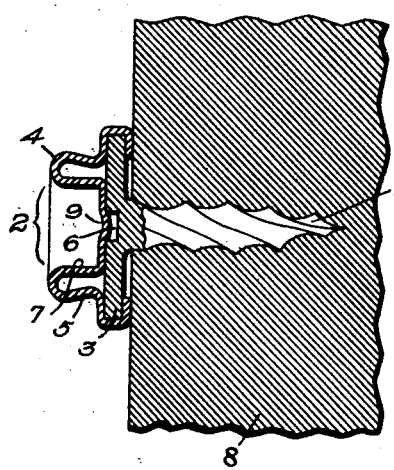
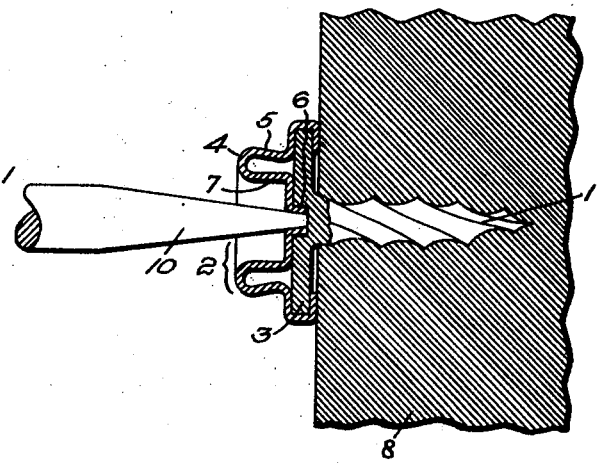
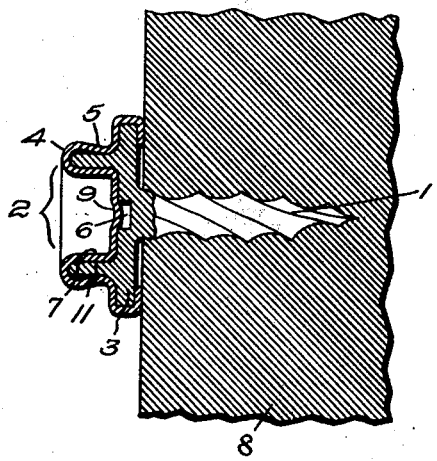
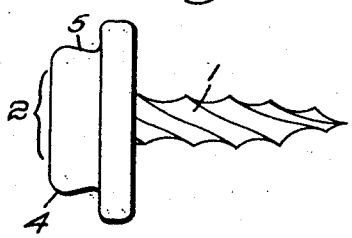
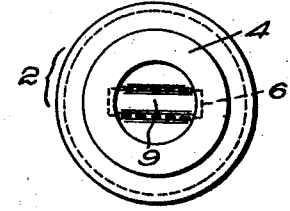
Inventor:
Moses F. Carr
by Emery, Booth, Janney & Varney
Attys Patented Apr. 30, 1929.

1,711,456

UNITED STATES PATENT OFFICE.

MOSES F. CARR, OF LEXINGTON, MASSACHUSETTS, ASSIGNOR, BY MESNE ASSIGNMENTS, TO CARR FASTENER COMPANY, A CORPORATION OF MASSACHUSETTS.

FASTENER STUD.

Application filed February 18, 1928. Serial No. 255,336.

My invention aims to provide improvements in separable fastener studs.

In the drawings, which illustrate preferred embodiments of my invention:—

Figure 1 is a section showing a stud attached to a stud support;

Fig. 2 is a section similar to that shown in Fig. 1, but also shows the end of a screwdriver blade driven into engagement for turning the drive screw to remove the stud from the support;

Fig. 3 shows a stud installation similar to that shown in Fig. 1, except that the head of the screw is formed to back-support the head of the stud;

Fig. 4 is a side elevation of a stud; and

Fig. 5 is an end view of a stud showing the tool-receiving slot in dotted lines and also showing the slot-indicating means.

Referring to the drawings, I have shown a stud unit which includes a drive screw 1 and a socket-receiving part 2. The parts of the unit are, in general, the same in contour and operation as the unit shown and more fully described in the United States Letters Patent to Moses F. Carr No. 1,643,981, issued October 4, 1927. Therefore, in the present application I shall describe in detail only as much as is necessary to clearly explain my present invention.

Heretofore in fastener stud units of this type a screw-driver or other tool-receiving depression was provided centrally of the stud by pressing a portion of the socket-receiving part into a depression provided in the head of the attaching elements. Therefore, when assembling the parts of the unit, it was necessary to align the depressed portion of the socket-receiving part with the slot in the screw head.

My present invention simplifies the assembling operation of fastener stud units of the type illustrated by eliminating the necessity of aligning the parts. At the same time, I have provided a unit which may be readily and easily removed from a support by rotation as will hereinafter appear.

Referring now to Figs. 1 and 2, I have shown the drive screw 1 with a relatively thin flat head 3 to which the socket-engaging part 2 having the head 4 and neck 5 is secured in the usual manner.

The head 3 of the drive screw 1 has a slot 6 located centrally of the head. The centrally depressed portion 7 of the socket-engaging part 2 spans this slot 6 without to any extent entering the same. Therefore, when assembling the screw 1 with the part 2 it is unnecessary to pay any attention to the location of the slot 6. The tool-receiving slot 6 is, therefore, normally not accessible to receiving a tool and is concealed by the depressed portion 7.

The stud unit shown by Figs. 1 and 2 may be attached to a support 8 by a driving tool (not shown) in the same manner as described in the above referred to patent. When the unit is finally driven into place the driving pressure exerted upon the bottom of the depressed portion 7 and against the top of the screw head 3 will make a slight impression 9 of the underlying slot 6 in the depressed portion 7, as indicated by Figs. 1 and 5. This impression 9 is not sufficient to receive the blade of the screwdriver and merely serves as indicating means. If desirable, the indicating means may be formed at the point of manufacture of the stud unit by action of a suitable die during the assembly operation of the unit.

When it is desirable to remove the stud unit from the support 8, the operator merely places the end of a screw-driver blade 10 (Fig. 2) in alignment with the impression 9 and drives the screw-driver against the bottom of the depressed portion 7 to break through the material thereof and force the blade 10 into the underlying slot 6. By turning the blade 10 in a contra-clockwise direction the drive screw 1 may be turned out of the support 8 as readily as if the slot 6 were exposed at all times.

In Fig. 3, I have illustrated a stud unit which has a drive screw 1 provided with a head 3 which has a wall 11 extending between the walls of the head 4 and neck 5 of the socket-receiving part and the wall of the depressed portion 7 to engage and back-support the outer end of the stud as illustrated. With this type of stud structure the unit may be attached to the support 8 by merely pounding upon the head or outer end of the unit.

In some instances it may be necessary to press the bottom of the depressed portion against the end of the screw head 3, adjacent to the slot 6, during the assembling operation of the unit in order to make the impression 9.

The devices which I have illustrated and described are simple in construction, easy to assemble, durable and inexpensive to manufacture.

While I have illustrated and described two embodiments of my invention, I do not wish to be limited to the structures shown and described as the scope of my invention is best defined in the following claims.

Claims:

1. A fastener stud including a socket-engaging part having a head and a neck, an attaching element having a head secured to said socket-engaging part and a threaded shank portion projecting from said head for securing said stud to a support, said head having a tool-receiving depression and said socket-engaging part having a portion normally concealing said tool-receiving depression but being adapted to be pressed into said depression by a turning tool whereby said stud may be rotated.

2. A fastener stud including a socket-engaging part having a head and a neck, a drive screw having a slotted head to which said socket-engaging part is secured, said socket-engaging part having a portion spanning the slot in the head of said drive screw and normally excluded therefrom but being adapted to be pressed or broken through to permit access of a tool for turning said stud when it is desired to detach the stud from a support.

3. A fastener stud including a socket-engaging part having a head and a neck, an attaching element having a head secured to said socket-engaging part and a threaded shank portion projecting from said head for securing said stud to a support, said head having a tool-receiving depression and said socket-engaging part having a portion normally concealing said tool-receiving depression but being adapted to be pressed into said depression by a turning tool whereby said stud may be rotated and indicating means provided in the portion covering the tool-receiving depression to indicate the location thereof.

4. A fastener stud including a socket-engaging part having a head and a neck, a drive screw having a slotted head to which said socket-engaging part is secured, said socket-engaging part having a portion spanning the slot in the head of said drive screw and normally excluded therefrom but being adapted to be pressed or broken through to permit access of a tool for turning said stud when it is desired to detach the stud from a support and said drive screw head having a portion back-supporting the outer end of the stud so as to permit driving the screw into a support by pounding directly against the outer end of the stud head.

5. A fastener stud unit including a socket-engaging part 2 secured to an attaching element 1, means providing a slot 6 in a head 3 of the attaching element 1 and a slight indicating depression 9 provided by the socket-engaging part 2 to indicate the location of the slot 6 in the head 3, the material of the said indicating depression in the socket-engaging part 2 being adapted to be forced into the slot 6 to permit a tool to be entered into said slot 6.

In testimony whereof, I have signed my name to this specification.

MOSES F. CARR.